May 5, 1964     M. QUENOT     3,131,480
MEASURING TAPE
Filed Aug. 23, 1962
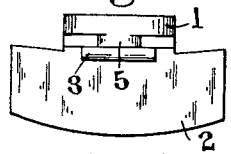
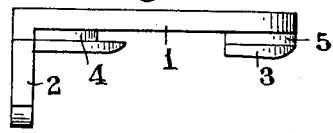
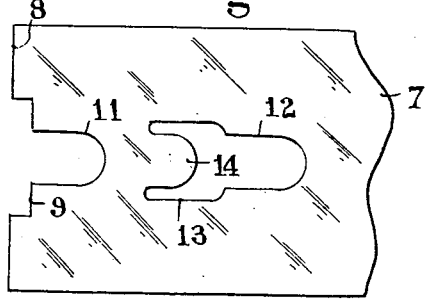
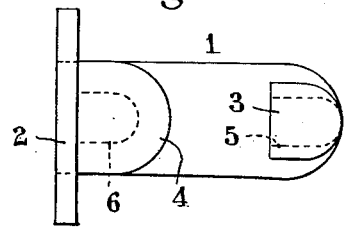
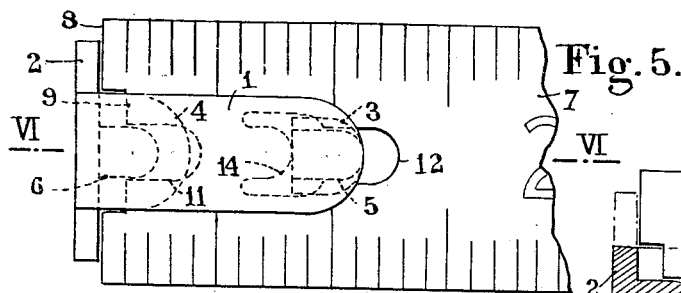
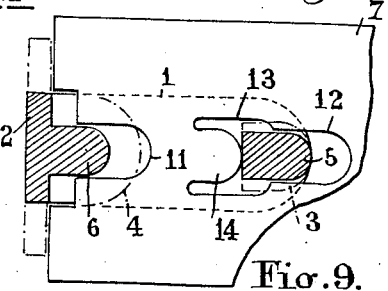
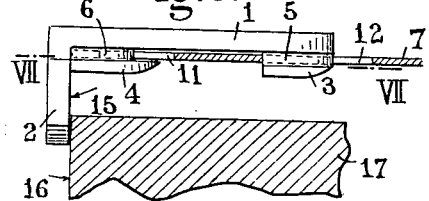
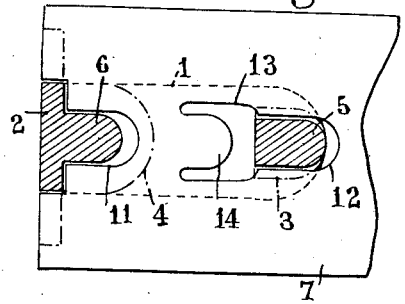
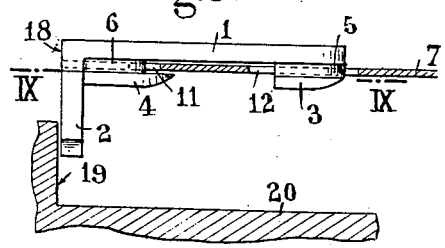
INVENTOR
Michel Quenot
BY Holcombe, Wetherill & Brisebois
ATTORNEYS

United States Patent Office 3,131,480
Patented May 5, 1964

3,131,480
MEASURING TAPE
Michel Quenot, Besancon (Doubs), France, assignor to Etablissements Quenot & Cie, Besancon (Doubs), France
Filed Aug. 23, 1962, Ser. No. 219,056
1 Claim. (Cl. 33—137)

The invention relates in general to measuring instruments of the type utilizing a flexible metal tape and has specific reference to improvements in the measuring tapes of these instruments.

As a rule, measuring tapes equipping these instruments comprise at their outer or free end a hook, square or like member having in general the twofold purpose of facilitating the extraction of the tape from its case and preventing the tape from winding completely therein; when these instruments are designed for measuring both internal and external dimensions, this hook or like member is usually adapted to slide longitudinally in relation to the tape to an extent corresponding to the thickness of the hook, so that the fitting of the hook is attended by certain difficulties.

It is the object of this invention to provide a hook or like member of the type defined hereabove for fitting on the outer or free end of a measuring tape of an instrument of the type set forth, which is adapted to permit said sliding movement along the tape end while avoiding the manufacturing and assembly complications characterizing prior art hooks. The invention consists of a linear dimension instrument of the flexible metal tape type, for measuring at will inner dimensions and outer dimensions, the free end of the tape carrying a hook formed with a depending portion extending at right angles to a base part which is attached to and is parallel with the tape, said base part being adapted to slide relative to said tape through a distance equal to the thickness of its depending portion, wherein said hook comprises under its lower face a pair of integral projecting shoes disposed longitudinally and spaced from each other along the tape axis, each shoe having a central portion of a thickness or depth slightly greater than the tape thickness and a width less than that of the lower adjacent portion of the shoe, the free end of said tape having two openings formed therein which correspond to the aforesaid pair of shoes, and of which one opening may be in the form of a notch, each opening comprising a first portion of a length and width slightly greater than those of the narrow portion of said shoes, a contiguous portion of a width slightly greater than that of the widest portion of said shoes, and, in addition, an elastic lug cut in and formed integrally with said metal tape and extending partially into the widest portion of one of the two openings in said tape extending longitudinally and somewhat spaced from each other along the tape axis, each shoe having a central portion of a thickness slightly greater than the tape thickness and a width smaller than that of the upper and lower portions surrounding it, the free end of the tape being perforated and notched, the tape perforation and notch corresponding to said shoes and comprising a first portion having a length and a width slightly greater than those of the narrowest portion of said shoes, a contiguous portion of a width slightly greater than that of the widest portion of said shoes, and, in addition, an elastic lug cut in said tape and extending partially through the widest portion of at least one of the tape perforation and notch.

With this arrangement the hook may be releasably locked on the tape by engaging the shoes through the widest portion of said perforation or notch while causing the elastic deformation of the lug extending therethrough, whereafter these shoes are slightly moved towards and locked in the narrowest portions of the perforations, these portions fitting around the narrowest portions of the two shoes and being prevented from escaping therefrom by said lug.

The accompanying drawing illustrates diagrammatically by way of example a typical embodiment of the invention. In the drawing:

FIGURE 1 is a side elevational view of the hook.
FIGURE 2 is an end view thereof.
FIGURE 3 is a plan view from beneath.
FIGURE 4 is a plan view showing the end portion of the tape before fitting the hook thereon.
FIGURE 5 is a similar view with the hook positioned on the tape and a scale graduation printed on the tape.
FIGURE 6 is a section take upon the line VI—VI of FIG. 5, which shows the hook in the position for measuring external dimensions.
FIGURE 7 is a section taken upon the line VII—VII of FIG. 6.
FIGURE 8 is a view similar to FIG. 6 showing the hook in the position for measuring internal dimensions.
FIGURE 9 is a section taken upon the line IX—IX of FIG. 8.

The hook illustrated in the drawing comprises a base or main portion 1 and a depending end portion 2 constituting the hook proper; cast integrally with and at right angles to the base 1 are a pair of shoes 3, 4 each comprising a central portion 5, 6 of a width smaller than the outer face of the shoe; the thickness or depth of this portion 5, 6 is slightly greater than that of the tape 7.

The tape is formed at its outer end 8 with a notch comprising an outer portion 9 of a width slightly greater than that of the hook 2 adjacent shoe 4 and base 1, and a depth substantially equal to the upper portion of thickness of said hook, and of an inner portion 11 adapted to receive the central, narrower portion 6 of shoe 4.

The tape is provided in addition with a perforation aligned with the notch 9, 11 which perforation comprises a narrow inner or back portion 12 and a wider outer or front portion 13, said narrow portion 12 being adapted to receive the central, narrow portion 5 of shoe 3, the latter passing on the other hand freely through the outer or front portion 13, except that a resilient lug 14 extends partially into this portion 13, the elasticity of lug 14 being sufficient to permit the ingress of said shoe 3 through said wider portion 13 of the perforation; the distance between the free end of lug 14 and the innermost end of the outer portion 12 being equal to the length of the narrowest portion of shoe 5, plus the thickness of the hook 2, thus permitting, as will be explained presently, a sliding movement of the hook between two end positions spaced from each other by a distance equal to the thickness of hook 2.

To fit the hook on the tape end, the operator first engages the notch 9, 11 on the tape end around the hook 2 and the narrow portion 6 of the shoe 4, the other shoe 3 bearing then on the upper face of the tape; a pressure is then exerted on the upper face of hook base 1, thus resiliently bending the lug 14 and causing the shoe 3 to penetrate into the wider portion 13 of the perforation to a degree sufficient to permit the longitudinal movement of the hook part 2 towards the tape and cause the edges of the narrow portion 12 of the perforation to fit around the narrow portion 5 of shoe 3, between the base 1 of the hook and the larger portion of the shoe. Then, the lug 14 is free and resumes its initial position in which it is co-planar with the tape 7; if then the hook is receded its sliding movement is limited by the lug 14 and the edges of portion 12 of the perforation remain trapped between the larger portion of shoe 3 and the hook base 1.

The maximum sliding movement or stroke of the hook is equal to the thickness of the bent portion 2 thereof since it is limited on one side by the edge of lug 14 and on the other side by the edge of notch 9 engaged by the other end of said shoe, the distance between these two edges being, by construction, on the other hand equal to the length of said shoe plus the thickness of the bent portion 2 of the hook, as already explained hereinabove.

Under these conditions, when it is desired to make an external measurement, as shown in FIGS. 6 and 7, the hook 2 is pulled out and slid in relation to the tape to its outermost position shown in said FIGS. 6 and 7, the distances to be measured being calculated from the inner edge 15 of the hook engaging the outer surface 16 of the object 17 to be measured.

On the other hand, when it is desired to measure an internal dimension, as shown in FIGS. 8 and 9 of the drawing, the hook 2 is slid in the opposite direction, that is, toward the tape 7, and the distances are then measured from the outer face 18 of hook 2 which engages the inner edge 19 of the object to be measured.

Of course, although the present invention has been described in conjunction with a preferred embodiment, it is to be understood that modifications and variations may be resorted to without departing from the spirit and scope of the invention, as those skilled in the art will readily understand. Thus the tape may have openings in it associated with the two shoes, which two openings and two shoes may be of annular form; and these shoes may have any other shape than that shown, notably that of mushroom shape.

What I claim is:

A linear measuring instrument of the flexible metal tape type, for measuring at will inner dimensions and outer dimensions, the free end of the tape carrying a hook formed with a depending portion extending at right angles to a base part which is attached to and is parallel with the tape, said base part being adapted to slide relative to said tape through a distance equal to the thickness of its depending portion, wherein said hook comprises under its lower face a pair of integral projecting shoes disposed longitudinally and spaced from each other along the tape axis, each shoe having a central portion of a thickness or depth slightly greater than the tape thickness and a width less than that of the lower adjacent portion of the shoe, the free end of said tape having two openings formed therein which correspond to the aforesaid pair of shoes, and of which one opening may be in the form of a notch, each opening comprising a first portion of a length and width slightly greater than those of the narrow portion of said shoes, a contiguous portion of a width slightly greater than that of the widest portion of said shoes, and, in addition, an elastic lug cut in and formed integrally with said metal tape and extending partially into the widest portion of one of the two openings in said tape.

References Cited in the file of this patent

UNITED STATES PATENTS 2,466,405    Fowler _____ Apr. 5, 1959

FOREIGN PATENTS 402,200    Great Britain _____ Nov. 30, 1933